United States Patent [19]

Bergishagen

[11] Patent Number: 5,352,717
[45] Date of Patent: Oct. 4, 1994

[54] ADHESIVES AND SEALANTS

[75] Inventor: Finn Bergishagen, West Bloomfield, Mich.

[73] Assignee: American Maize Technology Inc., Dimmitt, Tex.

[21] Appl. No.: 97,766

[22] Filed: Jul. 26, 1993

Related U.S. Application Data

[60] Division of Ser. No. 952,608, Sep. 28, 1992, Pat. No. 5,258,414, which is a continuation-in-part of Ser. No. 764,347, Sep. 23, 1991, abandoned, which is a continuation-in-part of Ser. No. 518,794, May 4, 1990, Pat. No. 5,063,251.

[51] Int. Cl.$^5$ .................................... C08L 3/02
[52] U.S. Cl. .................................... 524/48; 521/84.1; 521/109.1
[58] Field of Search ............... 524/48; 521/84.1

[56] References Cited

U.S. PATENT DOCUMENTS

| | | |
|---|---|---|
| 3,453,259 | 7/1969 | Parmerter et al. . |
| 3,502,601 | 3/1970 | Case et al. . |
| 3,957,702 | 5/1976 | Molotsky et al. . |
| 4,150,192 | 4/1979 | Downey . |
| 4,677,177 | 6/1987 | Shibanaia et al. . |
| 4,681,934 | 7/1987 | Shibanai et al. . |
| 4,711,936 | 12/1987 | Shibanai et al. . |
| 4,722,815 | 2/1988 | Shibanai ................... 524/48 |
| 4,725,657 | 2/1988 | Shibanai ................... 524/27 |
| 5,001,176 | 3/1991 | Nakazima ................... 524/48 |
| 5,063,251 | 11/1991 | Bergishagen . |
| 5,177,129 | 1/1993 | Bobo, Jr. ................... 524/48 |

FOREIGN PATENT DOCUMENTS

| | | |
|---|---|---|
| 171434 | 2/1986 | European Pat. Off. . |
| 1548917 | 12/1968 | France . |
| 3-250035 | 11/1991 | Japan . |

OTHER PUBLICATIONS

Uniroyal, Chemical Blowing Agents Selector Guide, ASP-4384.
Uniroyal, Celogen Blowing Agents, ASP-3122.
R. LaClair, "Blowing Agents for Structural Foam Molding", Plastics Technology, 22, 3, pp. 31–36, 1977.
M. Reisch, "Adhesives and Sealant Formulators Look to Specialties for Growth", Chem. and Eng. News, Feb. 27, 1989, pp.31 et seq.
D. Rowland, "Blowing Agents," May 1977.

*Primary Examiner*—Morton Foelak
*Attorney, Agent, or Firm*—Lucas & Just

[57] ABSTRACT

The improved adhesion is provided by incorporating into an adhesive and/or sealant plastic material an effective amount of cyclodextrin or a complex of cyclodextrin and blowing agent. Where the complex of cyclodextrin and blowing agent is employed, an expandable mixture is formed.

4 Claims, No Drawings

ADHESIVES AND SEALANTS

This application is a divisional of application Ser. No. 952,608 filed Sept. 28, 1992, now U.S. Pat. No. 5,258,414 which in turn is a continuation-in-part of application Ser. No. 764,347 filed Sept. 23, 1991, now abandoned, which in turn was a continuation-in-part of application Ser. No. 518,794 filed May 4, 1990, now U.S. Pat. No. 5,063,251.

This invention relates to adhesives and sealants and, more particularly, to a process for improving the adhesion of adhesives and sealants as well as an adhesive and sealant composition which displays improved adhesion. The invention has been found to be especially useful for expanded adhesives and sealants which traditionally employed a blowing agent.

Blowing agents, sometimes referred to as foaming agents, are substances that produce a cellular structure in a fluidized plastic or rubber composition. Conventional blowing agents include fluorocarbons, nitrogen gas, hydrazine derivatives, trihydrazide triazine, 5-phenyl tetrazole, p-toluene sulfonyl semicarbazide, modified azodicarbonamide, and azodicarbonamide. Chemical blowing agents are a class of blowing agents which are solids or liquids at room temperature and, upon heating, release a gas. A well-known class of chemical blowing agents is sold under the trademark CELOGEN by Uniroyal, Inc.

Blowing agents are used in making a variety of consumer products and automotive sealants. Further, blowing agents are used with adhesive plastic materials in a hot melt adhesive. Blowing agents are also used in foodstuff wrapping which is applied to the exterior of animal parts after they have been butchered and prior to wholesale. Such product is referred to by some as "bone wrap".

Typically, chemical blowing agents are used by mixing the chemical blowing agent with a solid plastic material and then heating the admixture while maintaining the mix under pressure. Heating fluidizes the plastic material and causes the blowing agents to release a gas. The gas forms bubbles or cells in the fluid plastic material.

Chemical blowing agents have the advantage over gaseous blowing agents in that they can be added to the solid plastic material prior to heating. Gaseous blowing agents such as nitrogen and some fluorocarbons must be injected into the fluidized plastic material. With hot melt adhesives and sealants, a gas is mixed with the adhesive composition prior to the end of the nozzle.

The use of fluorocarbons as blowing agents has come under close scrutiny due to its alleged effect on the earth's ozone layer. Other conventional blowing agents present problems with handling, toxicity, and flammability. Handling problems include storage stability, dust, and explosion hazards.

It has now been discovered that the use of the cyclodextrin in sealants and adhesive compositions improves the adhesive quality of the sealant or adhesive composition. It has also been discovered that a complex of cyclodextrin and blowing agent functions as a blowing agent in fluidized adhesive and/or sealant plastic materials as well as improving the adhesive property of the adhesive or sealant. The cyclodextrin has been found to stabilize the blowing agent. It has also been discovered that certain chemical compounds can be used as blowing agents which were heretofore never used as blowing agents.

The process according to the present invention comprises admixing a cyclodextrin with an adhesive or sealant plastic material and then applying the admixture to a surface. In the case of an expandable sealant or adhesive, the process comprises the steps of forming an admixture comprising an adhesive and/or sealant plastic material and a complex of a blowing agent and a cyclodextrin and heating the admixture so as to fluidize the plastic material and cause the complex to release a gas. The gas forms cells in the fluidized plastic material.

A step of forming a complex between the cyclodextrin and the blowing agent is accomplished prior to the step of mixing the complex with the plastic material.

The step of heating the admixture is accomplished either by applying heat to the admixture as is typically the case in conventional extrusion or blow molding processes, or through an exothermic reaction, such as is normally the case with a polyurethane.

An adhesive and/or sealant composition made in accordance with the present invention comprises an adhesive and/or sealant plastic material and a complex of a blowing agent and a cyclodextrin. As noted above, it has been found that the adhesive nature of the sealant or adhesive composition is improved by the presence of the cyclodextrin in the composition. Thus, the cyclodextrin performs not only as a host for the blowing agent but also as an agent or means for improving the stickiness or tackiness of the sealant or adhesive.

The amount of cyclodextrin added to the adhesive and/or sealant plastic material is an effective amount to improve the adhesion of the adhesive and/or sealant. Preferably, the amount of cyclodextrin added to the adhesive and/or sealant plastic material to improve its adhesion is about 1 to about 30 parts by weight based on 100 parts of adhesive and/or sealant plastic material (php). More preferably, about 1 to about 15 php of cyclodextrin is added to the adhesive and/or sealant plastic material to improve its adhesion. Most preferred is to add about 1 to about 10 php of cyclodextrin to the adhesive and/or sealant plastic material to improve the adhesion. The amounts listed herein are also the amount of complex of cyclodextrin and blowing agent which is added to the adhesive and/or sealant plastic material in accordance with the present invention.

In order to form the admixture between the cyclodextrin and the adhesive and/or sealant plastic material or the complex of cyclodextrin and blowing agent and the adhesive and/or sealant plastic material, any conventional mixing procedure normally employed with the adhesive and/or sealant materials may be used.

Cyclodextrins, also called "Schardingers dextrins", cycloamyloses, cyclomaltoses and cycloglucans, are oligomers of anhydroglucose, bonded together by alpha 1,4 bonds to form a ringed compound. A six membered ring is called alpha cyclodextrin; seven, beta cyclodextrin, and eight, gamma cyclodextrin. These six, seven and eight membered rings are also referred to as cyclomaltohexaose, cyclomaltoheptaose and cyclomaltoctaose, respectively.

Conventionally, cyclodextrins are obtained by treating a starch slurry with enzyme or acid to produce a gelatinized and liquefied slurry having a DE between 1 and 5. The gelatinized and liquefied starch slurry is then treated with cyclodextrin glycosyltransferase (CGT), at the appropriate pH, temperature and time for the selected CGT. The enzyme, CGT, is obtained from microorganisms such as *Bacillus macerans, B. magaterium, B. circulans, B. stearothermophilus,* and Bacillus sp. (alkalophilic) as well as others. The resulting digest from treatment of a gelatinized and liquefied starch slurry with CGT is then subjected to a separation and purification process to obtain cyclodextrins.

One of the commercially important aspects of cyclodextrins is their ability to act as a clathrate or host to other commercial compounds. Physically a cyclodextrin is donut-shaped- The consequence of this is that cyclodextrins are able to act as a clathrate with substances that have outer geometric dimensions corresponding to the diameter of the cyclodextrin cavity. Often the exterior is modified by adding a side chain such as hydroxy-propyl cyclodextrin onto the donut-shaped exterior of the cyclodextrin. The term "cyclodextrin" as used in the specification and claims means not only cyclodextrin per se but also modified cyclodextrins and branched cyclodextrins.

The term "complex" or the expression "complex of cyclodextrin and blowing agent" as used in the specification and claims means not only a composition of cyclodextrin and blowing agent where the cyclodextrin acts as a host to the blowing agent but also where the blowing agent is closely associated with the exterior of the cyclodextrin by weak bonding forces.

A method for formation of a complex between a cyclodextrin and a blowing agent involves dissolving the cyclodextrin in water with a blowing agent and collecting the precipitate that forms.

Another method is by charging a ball mill with a cyclodextrin and a blowing agent and milling the charge in the ball mill for a period of time. After milling, a complex will form between the cyclodextrin and the blowing agent. Other known methods for forming a complex between a cyclodextrin and a guest molecule include kneading, freeze-drying and co-grinding. Good results have been obtained by co-grinding using a mortar and pestle.

Suitably, the cyclodextrins used in the present invention are alpha, beta or gamma cyclodextrin. Beta cyclodextrin is preferred because of its commercial availability. A complex made from a combination of all three cyclodextrins provides different rates of release of the blowing agent. This is thought to be due in part to the different bond strengths between the blowing agent and the different cyclodextrins.

Suitable blowing agents include liquids such as water, propylene glycol, dipropylene glycol, tripropylene glycol, cyclohexyl amine, dicyclohexyl amine and ethylene glycol and solids such as benzoyl peroxide and other peroxides which are difficult to process. It is both surprising and unexpected that water, propylene glycol, dipropylene glycol, tripropylene glycol, and ethylene glycol are useful as blowing agents. Heretofore, water, propylene glycol, dipropylene glycol, tripropylene glycol, and ethylene glycol were not used as blowing agents due to their poor dispersion in plastic materials. Solids such as benzoyl peroxide are difficult to process because of low decomposition temperature. Both water and propylene glycol are considered safe and non-toxic to humans. Many conventional blowing agents are toxic to humans. The use of such non-toxic blowing agents in the workplace brings a degree of safety to the workplace heretofore unknown. By using a combination of two or more blowing agents such as water and propylene glycol or by using different cyclodextrins with the same blowing agents, the application temperature of the blowing agent is varied.

Additionally, conventional chemical blowing agents such as hydrazine derivatives, trihydrazide triazine, 5-phenyl tetrazole, p-toluene sulfonyl semicarbazide, modified azodicarbonamide, and azodicarbonamide which form a complex with cyclodextrin may be used as a blowing agent in accordance with the present invention. Conventional blowing agents complexed with cyclodextrin reduce dusting and stabilize the composition.

The amount of blowing agent that is complexed with the cyclodextrin is about 1 to about 30 parts by weight based on 100 parts by weight cyclodextrin (phc). More preferably about 3 to 15 phc is complexed. Most preferred is to complex between about 5 to about 7 phc of the blowing agent with the cyclodextrin.

In forming the complex between the cyclodextrin and blowing agent, an excess amount of blowing agent is used to form the complex.

A suitable source of the complex of cyclodextrin and water has been found to be the cyclodextrin as taken from a commercial operation for making cyclodextrin. The cyclodextrin obtained from a commercial process generally has about 10 to about 12 phc water. Using this cyclodextrin in an adhesive composition has been found to provide adequate gas upon heating such that the commercially obtained cyclodextrin, which is complexed with about 10 to about 12 phc water, works as a blowing agent.

Generally, it had been found that the smaller the particle size of the complex, the more uniform the bubbles were in size. Good results have been obtained with a complex of cyclodextrin and a blowing agent having a particle size capable of passing through 200 mesh.

Suitable plastic materials include polymers such as polystyrene, polyvinyl chloride, polyethylene, polyurethane, polyphenols, polypropylene, polyisoprene (rubber), polybutadiene as well as copolymers such as acrylonitrile-butadiene-styrene, styrene-isoprene, ethylene-butylene, styrene-butadiene rubber and ethylene vinyl acetate. Specific examples of adhesive plastic materials include ethylene vinyl acetate (EVA), acrylanitrile-butadiene- styrene and styrene-isoprene. Good results have been obtained using the complex of the present invention with EVA.

A typical adhesive made in accordance with the present invention comprises:

|  | Parts by Weight |
| --- | --- |
| EVA | 25–50 |
| Modified Resins | 25–60 |
| Waxes | 0–30 |
| Total Adhesive Plastic Material | 100 |
| Antioxidant | 0.05–0.5 php |
| Filler | 0–100 php |
| Blowing Agent-Cyclodextrin Complex | 1–10 php |

A bookbinding adhesive made in accordance with the present invention comprises:

|  | Parts by Weight |
| --- | --- |
| EVA | 35–45 |
| Modified Resin | 20–30 |
| Plasticizer | 20–30 |
| Wax | 10–20 |
| Total Plastic Adhesive Material | 100 |
| Antioxidant | 0.05–0.25 php |

| -continued | |
| --- | --- |
| | Parts by Weight |
| Blowing Agent-Cyclodextrin Complex | 1–10 php |
| Mildewcide (optional) | 1–10 php |

Preferably, the blowing agent-cyclodextrin complex is a water-cyclodextrin complex and has between about 8 and about 15 phc water. More preferably the amount of complex used in the bookbinding adhesive is between about 3 and about 7 phc and has a water content of about 10 to about 15 phc.

Use of a microbial or fungicide complexed with a cyclodextrin, if incorporated with the adhesive, helps prevent degradation. Water will act as the blowing agent and will aid in the release of the microbial or fungicide.

The bookbinding adhesive is made by mixing all the components together in a conventional manner.

Such adhesives have an application temperature around 120° to about 205° C.

The use of a complex of water and cyclodextrin has been found to have several advantages over the prior art of using liquid nitrogen. Present machinery for application of hot melt for bookbinding requires specialized machinery allowing incorporation of liquid nitrogen. With the cyclodextrin-water complex of the present invention a much wider range of equipment can be used. Additionally, the open time has increased, there is more surface contact and less adhesive is used to cover the same area.

A carton and case sealing adhesive is made in accordance with the present invention comprising:

| | Parts by Weight |
| --- | --- |
| EVA | 40 |
| Modified Resin | 40 |
| Wax | 20 |
| Total Plastic Adhesive Material | 100 |
| Antioxidant | 0.01 php |
| Blowing Agent-Cyclodextrin Complex | 1–10 php |

Preferably, the blowing agent-cyclodextrin complex is a propylene glycol-cyclodextrin complex and has between about 8 and about 15 phc of propylene glycol. Preferably about 3 to about 7 php of the complex is used having a propylene glycol content of about 10 to about 13 phc.

The carton and case sealing adhesive is made by mixing all the components together in a conventional manner.

Such carton and case sealing adhesive has an application temperature between about 175° to about 205° C.

A carpet backing adhesive made in accordance with the present invention comprises:

| | Parts by Weight |
| --- | --- |
| EVA | 25–50 |
| Modified Resin | 25–60 |
| Waxes | 0–30 |
| Total Plastic Adhesive Material | 100 |
| Antioxidant | .05–0.5 php |
| Filler | 0–100 php |
| Blowing Agent-Cyclodextrin Complex | 1–10 php |

The blowing agent-cyclodextrin complex used in this carpet backing adhesive is a complex of cyclodextrin with about 8 to about 15 phc of either water, propylene glycol or a combination of water and propylene glycol or a combination of water, propylene gylcol and hydrazine derivatives.

Additionally, such a carpet backing adhesive preferably contains a complex of cyclodextrin and mildewcide in an amount up to about 1 php. Suitable mildewcides include diiodomethyl-p-tolysulfone, phenols and butylhydroxytoluene; diidomethyl-p-tolysulfone is preferred, the release of which would be triggered by water released by the cyclodextrin.

The carpet backing adhesive is made by mixing all the components together in a conventional manner.

The application temperature of this carpet backing adhesive is between about 300° to 350° F.

It has been found that the presence of the cyclodextrin in these various adhesives and sealants also increases the adhesive nature of the sealant or adhesive composition.

A small amount of enzyme known as amylase added to the expandable plastic composition of the present invention will, upon heating, act as a catalyst to speed the release of the blowing agent from the cyclodextrin. For the amylase to act as a catalyst, some water must be present in the plastic composition. It is thought that the amylase will use the water to destroy the cyclodextrin thereby hastening the release of the blowing agent.

It will be understood that other compounds can be added to the plastic material containing the blowing agent of the present invention, to include mildewcides, fungicides, and fragrances.

These and other aspects of the present invention may be more fully understood by reference to the following examples:

EXAMPLE 1

This example illustrates a hot melt adhesive in accordance with the present invention and specifically, a bookbinding adhesive.

| Bookbinding Material | Parts by Weight |
| --- | --- |
| EVA-507 | 45 |
| Staybelite Resin | 25 |
| Pentalyn H | 20 |
| Microcrystalline Wax | 10 |
| Total Plastic Bookbinding Material | 100 |

To the adhesive plastic materials, 0.1 php of an antioxidant and 10 php of a water-beta cyclodextrin complex were added. The complex comprised 7.5 grams of beta cyclodextrin and 2.5 grams of water. The water was complexed with the cyclodextrin by mixing an excess of water with the cyclodextrin. After mixing the adhesive plastic materials with the antioxidant and the water-beta cyclodextrin complex, this admixture was heated to 100° C. at which point the water went from a liquid phase into a gas phase thereby-causing an expansion of the adhesive. The percent of expansion by volume of the adhesive was about 100%.

EVA-507 was a commercial grade of a copolymer of ethylene-vinyl acetate obtained from Union Carbide Corp. Staybelite resin was a hydrogenated resin and plasticizer consisting of diethylene glycol esters of hydrogenated resins obtained from Hercules Powder Co. Pentalyn H was a synthetic resin obtained from Hercules Powder Co. Microcrystalline wax was a commercially available wax obtained from Petrolite Corp. of Tulsa, Okla. The antioxidant was Irganox 1010 obtained from Ciba-Geigy Corp. The beta cyclodextrin was a commercial grade beta cyclodextrin obtained from American Maize-Products Company of Hammond, Ind. The water was regular tap water.

It is surprising and unexpected that a complex of cyclodextrin and water worked in this formulation because water, by itself, did not work as a blowing agent in the bookbinding adhesive.

EXAMPLE 2

This example illustrates making a carton and case adhesive in accordance with the present invention. The following adhesive composition was made:

| Material | Parts by Weight |
| --- | --- |
| EVA-305 | 40 |
| CKM-2400 | 15 |
| Piccolyte A-115 | 12.5 |
| Super STATAC | 12.5 |
| Polywax 1000 | 10 |
| Castor wax | 10 |
| Total Plastic Adhesive Material | 100 |

To the adhesive plastic materials, 0.1 php of an antioxidant and 10 php of a complex of propylene glycol-beta cyclodextrin were mixed. The complex contained 1 mole of beta cyclodextrin and 2 moles of propylene glycol. The complex of propylene glycol and beta cyclodextrin was made by mixing an excess of propylene glycol with the beta cyclodextrin.

The admixture of adhesive materials, antioxidant and propylene glycol-beta cyclodextrin complex was heated. Propylene glycol went from a liquid state to a gaseous state thereby causing the expansion of the adhesive composition. The adhesive composition expanded in volume due to the blowing agent, propylene glycol, by about 100%.

EVA-305 was a commercial grade of a copolymer of ethylene-vinyl acetate obtained from Union Carbide. CKM-2400 was obtained from Union Carbide. Piccolyte A-115 was a thermoplastic terpene resin obtained from Hercules. Super STATAC was obtained from Reichold Chemical Inc. Polywax 1000 was obtained from Bareco and Castor wax was obtained from Universal Preservachems. The antioxidant was Irganox 1010. The beta cyclodextrin was a commercial grade beta cyclodextrin obtained from American Maize-Products Company of Hammond, Ind. The propylene glycol was a commercial grade obtained from Dow Chemical.

It is both surprising and unexpected that a complex of propylene glycol and cyclodextrin worked in this formulation since propylene glycol, by itself, did not work as a blowing agent.

EXAMPLE 3

This example illustrates making a carpet backing adhesive in accordance with the present invention. The following adhesive composition was made:

| Material | Parts by Weight |
| --- | --- |
| EVA | 50 |
| Modifying resins | 40 |
| Waxes | 10 |
| Total Plastic Adhesive Material | 100 |
| Mildewicide (optional) | 1–10 php |

To the adhesive plastic materials, 0.1 php of an antioxidant, about 20 php of a filler, and 5 php of a complex of water and beta cyclodextrin are added along with 5 parts of a complex of propylene glycol-beta cyclodextrin. The complexes of blowing agent and cyclodextrin are made in accordance with Examples 1 and 2 above. The complexes of blowing agent and cyclodextrin are both mixed with the adhesive composition simultaneously in a manner according to Examples 1 and 2 above.

Upon heating the admixture of adhesive composition and both blowing agents to about 195° C. the adhesive admixture expands.

The EVA is a commercial grade of a copolymer of ethylene-vinyl acetate. The modified resins are commercial grades of wood rosin. The waxes are commercial grades of waxes used conventionally in carpet backing adhesives. The antioxidant is Irgonox 1010 and the fillers are conventional calcium carbonate.

EXAMPLE 4

This example illustrates making a pressure sensitive adhesive in accordance with the present invention. The following adhesive composition was made:

| Material | Parts by Weight |
| --- | --- |
| EVA 501 | 15 |
| EVA 605 | 30 |
| Staybelite Ester 10 | 37 |
| Abitol | 18 |
| Total Plastic Adhesive | 100 |

To the adhesive materials, 0.1 php of an antioxidant, Irganox 1010, 5 php of a complex of water and beta cyclodextrin and 5 php of cyclohexylamine and beta cyclodextrin were added. The water and beta cyclodextrin complex had 12.8 phc water. The complex of beta cyclodextrin and cyclohexylamine, volatile corrosion inhibitor, had 8 phc cyclohexylamine complexed with cyclodextrin. Making the complex and mixing of the adhesive composition was done in accordance with Example 1.

The released moisture provided a "trigger" mechanism whereby the complexed cyclohexylamine was partially released so as to be in equilibrium with the released moisture from the water-cyclodextrin complex. Such a mechanism provided corrosion protection to metallic surfaces. The complex of cyclodextrin and cyclohexylamine stabilizes the cyclohexylamine during the heating process. Uncomplexed cyclohexylamine is not stable during the heating of the adhesive. The EVA 501 and 605 were a commercial grade of a copolymer of ethylene-vinyl acetate obtained from Union Carbide. The Staybelite Ester 10 and the Abitol were obtained from Hercules. The application temperature of the adhesive was about 300° F. to 325° F.

EXAMPLE 5

This example illustrates making an expandable, curable sealant in accordance with the present invention.

| Ingredient | Parts |
| --- | --- |
| A. - Hot melt base | |
| Kraton FC 1901 x (available from Shell) | 100 |
| Regalrez 1018 (available from Hercules) | 270 |

| Ingredient | Parts |
| --- | --- |
| Endex 155 (available from Hercules) | 50 |
| Irganox 1010 (available from Ciba Geigy) | 1 |
| B. - Plasticizer | |
| over-based Calcium Sulfonate (available from Witco) | 10 |
| Beta cyclodextrin:dicyclohexylamine complex (2:1 molar ratio) | 2 |
| Aluminum paste (50:50 aluminum in Sunpar 2280 available from Sun Oil) | 1 |
| Beta cyclodextrin (10–13% $H_2O$) | 2 |

Equal amounts of the hot melt base and plasticizer were mixed and allowed to cool and then placed on a cold rolled steel sheet or galvanized cold rolled steel sheet. The sheets were placed in an oven and heated at 200° C. for 15 minutes. The material expanded on the plate in both a vertical and horizontal plane such that the mix about doubled in volume.

EXAMPLE 6

A mix of 50 parts hot melt base from Example 5 above was mixed with 50 parts over-based calcium sulfonate. The over-based calcium sulfonate was heated to evaporate water from it prior to mixing it with the hot melt base. The mixture was placed on a cold rolled steel plate and a cold rolled galvanized steel plate and heated in an oven at 200° C. for 15 minutes. The mix upon heating melted and spread out over the plates without expanding.

Adhesion Comparison Examples 5 and 6

The material made in accordance with Example 6 was tested for adhesion to cold rolled and galvanized steel plates against the material made in accordance with Example 5 above. The cured material of Example 5 above adhered much more strongly to the cold rolled and galvanized steel plates than the material of Example 6. It was found that the material of Example 6 was able to be easily peeled from the plates while the material made in accordance with Example 5 above (the present invention) did not easily peel.

EXAMPLE 7

A mix was made the same as Example 6 above, except that water was not removed from the over-based calcium sulfonate before mixing and placing it on the cold rolled steel plate and cold rolled galvanized steel plate in the oven at 200° C. The mix in this example simply hardened in place. Curing was accelerated due to the water release as evidenced by the lack of flowing or deformation of the material placed on the sheets.

EXAMPLE 8

A mix was made the same as Example 5 above, except that the mixture was not allowed to cool. The mix was placed on a cold rolled steel sheet and a cold rolled galvanized steel sheet and then placed in the oven at 200° C. This material expanded to about double in volume. The blowing agent (water), was in the cyclodextrin and was released upon heating along with the cyclohexylamine (the vapor phase corrosion inhibitor). In the cyclodextrin, the water is controlled and is not available for curing until sufficient heat is applied to trigger its release.

EXAMPLE 9

A conventional sealant was made from:

| Ingredient - Formula A | Parts |
| --- | --- |
| Kraton RD 6501 (available from Shell) | 100 |
| Regalrez 1018 (available from Hercules) | 270 |
| Endex 155 (available from Hercules) | 50 |
| Irganox 1010 (available from Ciba-Geigy) | 1 |

This material was mixed and placed on cold rolled steel and cold rolled galvanized steel sheets and placed in an oven at 200° C. for 15 minutes. This material melted and spread out on the plate.

EXAMPLE 10

This example uses Formula A to make a sealant in accordance with the present invention.

| Ingredient | Parts |
| --- | --- |
| Formula A | 10 |
| Beta cyclodextrin (10–13% water) | 2 |

These were mixed and placed on cold rolled steel or cold rolled galvanized steel sheets and placed in an oven at 200° C. for 15 minutes. This sealant did expand in volume, however, not by 100% of its initial volume.

Adhesion Comparison Examples 9 and 10

The adhesion to steel plates of the material made in accordance with Example 9 was tested against the adhesion of the material made in accordance with Example 10. It was found that the sealant of Example 10 (present invention) adhered to the steel plate better than the sealant of Example 9.

The sealant of Example 10 was also tested for relative adhesion between cold rolled steel and galvanized steel. It was found that the sealant of Example 10 adhered better to a cold rolled steel plate than to a galvanized steel plate.

EXAMPLE 11

This example illustrates using another chemical blowing agent complexed with the cyclodextrin.

| Ingredient | Parts |
| --- | --- |
| Formula A | 10 |
| Beta cyclodextrin dibutyl tin dilaurate complex (24% chemical blowing agent) | 2 |
| Beta cyclodextrin (10–13% water) | 2 |

After mixing, these were placed on cold rolled steel or cold rolled galvanized steel sheets and placed in an oven at 200° C. for 15 minutes. This material, upon heating, also expanded, to about 100% of its initial volume.

Adhesive Comparison Examples 9 and 11

The adhesion to steel plates of the material made in accordance with Example 9 was tested against the adhesion of the material made in accordance with Example 11. It was found that the sealant of Example 11 (present invention) adhered to the steel plate better than the sealant of Example 9.

The sealant of Example 11 was also tested for relative adhesion between cold rolled steel and galvanized steel. It was found that the sealant of Example 11 adhered better to a cold rolled steel plate than to a galvanized steel plate.

EXAMPLE 12

This example illustrates the use of a complex of beta cyclodextrin and benzoyl peroxide as both a blowing agent and a curing agent for a thermoplastic. The following compositions were made:

| Composition | Amount |
|---|---|
| A. Fusabond C-D198 (obtained from DuPont) | 10 g |
| Beta cyclodextrin complex of benzoyl peroxide (10% benzoyl peroxide) | 1 g |
| B. Fusabond C-D198 | 10 g |
| C. Fusabond C-D198 | 10 g |
| Beta cyclodextrin (10% water) | 1 g |
| D. Fusabond C-D198 | 10 g |
| Benzoyl peroxide | 0.1 g |

Each composition was mixed while heating and while still fluid was extruded into sheets of uniform thickness. Portions of equal length and weight were cut from the sheets and placed in an oven at 200° C.

During mixing of the uncomplexed benzoyl peroxide, decomposition of the benzoyl peroxide occurred as evidenced by the formation of bubbles. This was not observed while mixing the complex of benzoyl peroxide and beta cyclodextrin under the same conditions. The amount of benroyl peroxide was equal in both compositions. In the complexed state, the benzoyl peroxide was stabilized during mixing. It was also difficult to obtain a uniform distribution of the uncomplexed benzoyl peroxide during mixing. The beta cyclodextrin-benzoyl peroxide complex was easily mixed and uniformly distributed during mixing of the composition.

After heating, very noticeable differences were noted. Composition D, containing uncomplexed benzoyl peroxide cured very rapidly and did not spread out laterally to a great extent. Bubbles in the cured composition were not of uniform size and distribution.

Composition A containing the beta cyclodextrin complex of benzoyl peroxide also cured rapidly and did not spread out laterally to a great extent. Blowing and curing were occurring simultaneously. This composition had raised higher than sample D containing uncomplexed benzoyl peroxide. Bubbles in composition A were of uniform size and distribution.

Composition C spread laterally more than any of the other compositions. Water released from the cyclodextrin formed bubbles of uniform size and distribution. The water released was acting as a traditional blowing agent but no curing agent was present to cure the composition to retard spreading.

Composition B spread out laterally more than compositions A and D but not as much as Composition C. No curing agent was present which would retard spreading and no blowing agent was present which would increase spreading.

The best results were obtained from Composition A containing the complex of benzoyl peroxide and beta cyclodextrin. The benzoyl peroxide was stabilized to be released upon heating to act both as a curing agent and a blowing agent. The complex was also easily mixed into and dispersed in the composition.

It will be understood that it is intended to cover all changes and modifications of the preferred embodiment of the invention herein chosen for the purpose of illustration which do not constitute a departure from the spirit and scope of the invention.

What is claimed is:

1. A method for increasing the adhesive nature of a polymer adhesive and/or a polymer sealant material comprising the steps of:
    (a) adding to said adhesive and/or sealant material an effective amount of an uncomplexed cyclodextrin; and
    (b) mixing said polymer adhesive and/or polymer sealant material and uncomplexed cyclodextrin to form an admixture with improved adhesion.

2. The method of claim 1 wherein said cyclodextrin is a beta cyclodextrin.

3. The method of claim 1 wherein the amount of said cyclodextrin added to polymer adhesive and/or polymer sealant material is about 1 to about 30 parts per 100 parts by weight of said polymer material.

4. The method of claim 1 wherein said adhesive plastic material is ethylene-vinyl acetate.

* * * * *

UNITED STATES PATENT AND TRADEMARK OFFICE
CERTIFICATE OF CORRECTION

PATENT NO. : 5,352,717
DATED : October 4, 1994
INVENTOR(S) : Finn Bergishagen

It is certified that error appears in the above-indentified patent and that said Letters Patent is hereby corrected as shown below:

Column 1, line 26, after "and" insert --which--.

Column 3, line 10, change "donut-shaped-" to --donut-shaped.--

Column 5, line 13, change "microbial" to --microbiocide--; line 16, change "microbial" to --microbiocide--.

Column 6, line 57, change "thereby-causing" to --thereby causing--.

Column 9, line 63, delete the comma after "(water)".

Column 11, line 37, change "benroyl" to --benzoyl--; line 46, after "peroxide" insert --,--.

Column 12, line 34 (claim 1), after "said" insert --polymer--; after "and/or" insert --polymer--.

Column 12, line 43, (claim 3), after "to" insert --said--.

UNITED STATES PATENT AND TRADEMARK OFFICE
CERTIFICATE OF CORRECTION

PATENT NO. : 5,352,717
DATED : October 4, 1994
INVENTOR(S) : Finn Bergishagen

It is certified that error appears in the above-indentified patent and that said Letters Patent is hereby corrected as shown below:

Column 12, lines 46-47 (claim 4), change "adhesive plastic" to --polymer adhesive--.

Signed and Sealed this

Sixth Day of December, 1994

BRUCE LEHMAN

Attest:

Attesting Officer

Commissioner of Patents and Trademarks